Aug. 4, 1970  J. R. FENDLEY, JR  3,522,551
LASER TUBE CONSTRUCTION
Filed May 31, 1966
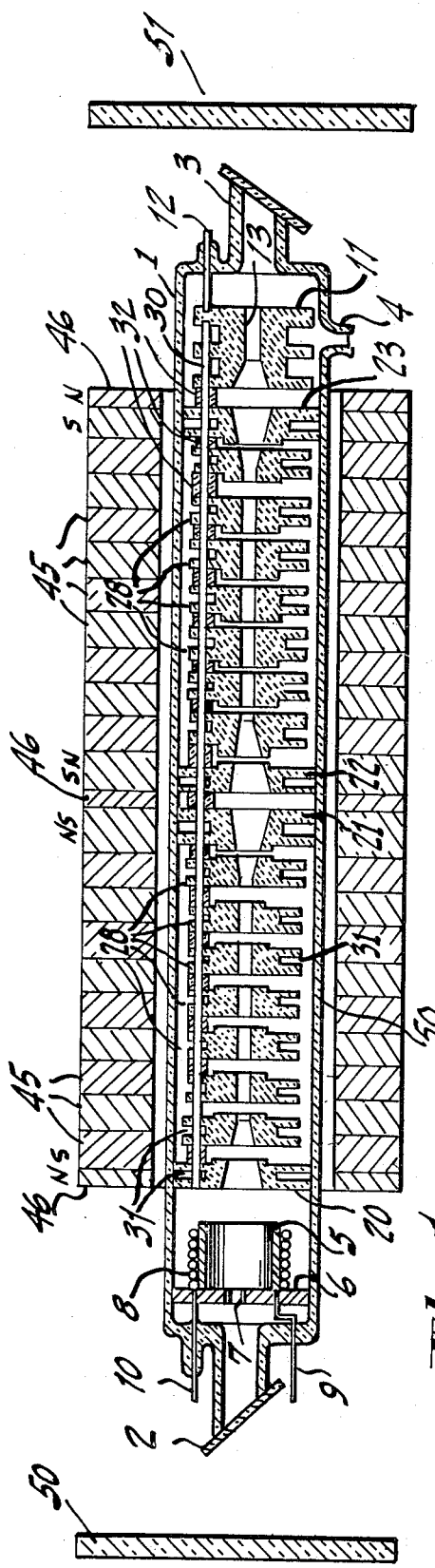
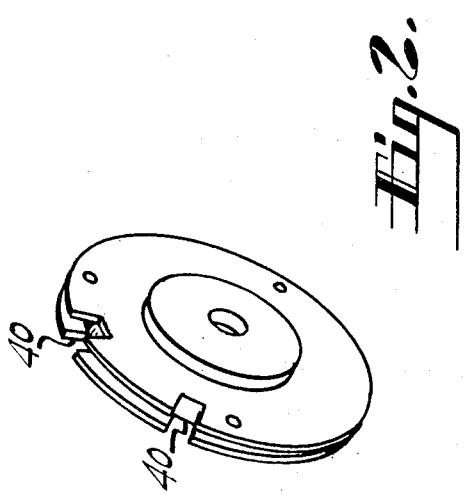
INVENTOR.
JAMES R. FENDLEY, JR.
BY
Edward J. Norton
Attorney United States Patent Office 3,522,551
Patented Aug. 4, 1970

3,522,551
LASER TUBE CONSTRUCTION
James R. Fendley, Jr., Trenton, N.J., assignor to
RCA Corporation, a corporation of Delaware
Filed May 31, 1966, Ser. No. 554,023
Int. Cl. H01s 3/00
U.S. Cl. 331—94.5          5 Claims

ABSTRACT OF THE DISCLOSURE

An exceptionally long life laser gas discharge tube utilizes a plurality of longitudinally spaced discs which are in spaced relationship with respect to the envelope of the tube and have aligned relatively small bores therethrough to provide a highly confined hot plasma within the region defined by these bores. These discs are supported by longitudinal dielectric rods which are in turn supported by other discs which do touch the envelope of the tube, but which have relatively large bores therethrough to provide a relatively cool plasma within the region defined by these bores. To prevent sputtering erosion of the discs by the plasma, the discs should preferably be composed of carbon, such as crystalline graphite.

---

This invention relates to lasers and particularly to a novel construction for a gas ion laser tube.

The operation of ion gas lasers requires that the laser plasma be excited to extremely high current densities. To achieve high current densities most ion lasers include some means to confine the plasma to a narrow radial dimension. In the typical prior art ion laser the confinement is accomplished simply by using a tubular vessel with a narrow bore. A serious problem with this construction is the relatively short lifetime of the tube due to ion bombardment at the tube walls. Certain problems are alleviated by the use of metallic rings to constrict the plasma. The life still leaves much to be desired, being of the order of 100 hours.

It is an object of the present invention to provide a novel gas laser tube.

It is a further object of the present invention to provide a novel plasma confining structure for an ion gas laser.

It is a further object of the present invention to provide a laser tube with an operating lifetime of 1,000 hours or more.

These and other objects are accomplished according to the present invention by constructing a laser tube employing confinement rings made of graphite. A tubular structure contains a number of graphite confinement rings which serve to constrict the plasma so that the required current densities are obtained. The graphite rings provide a lifetime far exceeding that of the typical quartz tube or the metallic confining rings.

A more detailed description of the present invention will be given with reference to the accompanying drawing in which:

FIG. 1 is a cross sectional view of a gas ion laser tube constructed according to the present invention and FIG. 2 is an isometric view of a confinement ring used in the tube of FIG. 1.

Before describing in detail the construction of the tube of FIG. 1, the problems involved in constructing gas ion laser tubes will be briefly reviewed.

The high current densities developed in continuous duty gas lasers present some particular engineering difficulties. The current densities are often in the neighborhood of 500 amperes per square centimeter with power dissipations well in excess of 50 watts per centimeter of plasma length. The high power and high current densities present both thermal problems and ion bombardment problems. The latter is the more significant because it causes a deterioration of the confining vessel. For example, where quartz tubes are used the ion bombardment decomposes the quartz resulting in a darkened tube and the appearance of decomposition products which can poison the cathode. Further, there is the likelihood of catastrophic failure of the quartz arc confinement tubing.

Proposals have been made for remedying these problems through the use of axial magnetic fields and metal plasma confinement structures. An axial magnetic field applied along the laser tube tends to constrict the plasma, and enhances the power output of the laser. Nevertheless, the problem of ion bombardment of the confining structure remains. Metallic rings, with narrow axial bores, placed within a vacuum tube whose diameter far exceeds the diameter of the plasma offer some advantages. The metal does not decompose as a result of ion bombardment and castastrophic failure associated with the quartz tube is not encountered. However, the use of metal confinement structures is accompanied by the problem of severe sputtering. Sputtering of the confinement structure with resulting changes in bore diameter has imposed a limitation on the lifetime of these tubes.

The present invention employs confinement rings made of graphite. Prior to the present invention it was generally thought that the sputtering process occurring in tubes employing metallic confinement rings was primarily a process of tangential ion bombardment. This led to the selection of confinement rings composed of metals having high heats of sublimation. Thus, metals such as molybdenum were used. In fact, however, the sputtering process is not primarily a process of tangential ion bombardment but rather it appears to be more a process of normal ion bombardment. Thus, it has been found that the use of graphite to confine the plasma of an ion gas laser has significant advantages over the use of the conventional metals.

FIG. 1 is a diagram of an ion gas laser including a laser tube constructed according to the present invention. The tube comprises a vacuum vessel 1 constructed preferably of quartz with two Brewster angle windows 2 and 3 positioned at either end of the tube. The tube is filled with a suitable noble gas such as argon or krypton or a mixture of noble gas and mercury vapor in the conventional manner. Conventional means 4 are provided for connecting the tube to a gas reservoir (not shown). An axially symmetric cathode 5 is positioned at one end of the tube 1 and is mounted on a suitable supporting structure 6. The supporting structure 6 contains a passage 7 to allow light from the laser tube to pass through the structure 6 to the window 2. A heating element 8 surrounds the cathode 5 in a conventional manner. Electrodes 9 and 10 provide connections to the cathode 5 and the heater 8.

An anode 11 preferably made of graphite, is positioned at the other end of the tube 1. An electrode 12 provides electrical connection to the anode 11. A passage 13 is formed in the anode 11 to provide an optical path to the window 3.

The tube is placed between two mirrors 50 and 51 in a conventional manner. The mirrors 50 and 51 form a cavity for the laser.

A plurality of plasma confining rings are positioned between the cathode 5 and the anode 11. On the cathode end of the tube 1 the first confining ring 20 is fitted to contact the wall of the tube 1. Similarly the two rings 21 and 22 in the middle of the tube 1, and the ring 23 at the anode end of the tube touch the walls of the tube 1. The remaining confinement rings 28 are spaced from the wall of the tube 1 for thermal radiation purposes. Support for the confinement rings 28 is provided by three sapphire or other dielectric rods, one of which 30, is shown in at the top portion of the tube. The other two rods have been omitted from the figure for purposes of simplicity. The rod 30 is supported by the confinement rings 20 through 23 which are securely positioned within the tube 1. A plurality of spacers 32 of suitable insulating material, e.g. a 99+% pure alumina ceramic, separate the various confinement rings. Each of the confining rings, and the anode 11, contain circumferential recessed portions 31 for thermal radiation enhancement.

Excellent results are obtained when the confinement rings are fabricated from polycrystalline graphite. An example of a suitable graphite is POCO graphite, made by Poco Graphite Inc. However, other forms of carbon may be used. Another example might be a coating of carbon over a base material in the confining area of the ring.

Each of the confinement rings has a passage through its center to permit the development of a plasma along the length of the tube. Most of the rings have a narrow bore which confines the plasma so the required current densities can be developed. Typically the diameter of the bore will be three millimeters. The other confinement rings 20 through 23 have somewhat larger and tapered bores. The larger and tapered bores serve the purpose of providing a general decrease in plasma constriction from the non-constricted areas at both ends of the tube and at the center of the tube (the non-constricted portion the center of the tube is due to the arrangement of the axial magnetic field described below). Also, the larger bores of these rings result in these rings being heated to a lesser extent than the remaining rings. Since these are the only rings that contact the wall of the tube 1, the amount of heat conducted to the tube wall is relatively small.

FIG. 2 is an isometric diagram showing the construction of one of the confinement rings used in the tube of FIG. 1. The ring contains one or more notches 40 which are not shown in the FIG. 1 diagram for purposes of simplicity of description. Each of the rings of the tube of FIG. 1 contains such notches. The purpose of the notch is to provide a local circulating path for the gas in the tube 1. The notches 40 of various rings are not aligned along the tube but rather are angularly displaced from one another to prevent a plasma from forming along the notches.

An axial magnetic field, having an odd number of field reversals (here one), is established in the tube 1 by employing a plurality of ferrite discs 45 positioned along the length of the tube 1. The construction of these discs 45 is conventional in the microwave traveling wave tube art. The ferrite discs 45 on the cathode side of the tube are positioned with their magnetic poles facing one direction, while the discs on the anode side of the tube have their magnetic poles facing in the opposite direction. Iron pole pieces 46 are provided at the two ends and at the center of the field structure. This construction is conventional in the tube art. At the center of the tube, where a field reversal takes place, the confinement rings 21 and 22 have a larger and tapered diameter. An annular passage 50 is provided between the field structure and the wall of the tube to permit a cooling fluid to pass over the tube.

What is claimed is:

1. In a longitudinal gas discharge tube suitable for use in a laser, wherein said tube comprises a gas-filled envelope and a structure within said envelope for confining a plasma formed in said gas when excited; the improvement wherein said structure comprises at least a pair of longitudinally-spaced first-type discs supported by and touching said envelope, at least one dielectric rod extending between and supported by said pair of first-type discs, a plurality of longitudinally-spaced second-type discs located intermediate said first-type discs and supported by said dielectric rod, said second-type discs being in spaced relationship with respect to said envelope, each of said discs being provided with a bore therethrough which is substantially longitudinally aligned with the bores of all other discs, the bores of said second-type discs having a relatively small size for producing a plasma within the region defined thereby having a current density sufficient to sustain laser action and the bores of said first-type discs having a relatively large size for producing a plasma within the region defined thereby having a current density insufficient to sustain laser action.

2. A gas tube defined in claim 1, wherein the respective bores through all of said second-type discs have a cylindrical surface of the same given diameter, the bore through each of said first-type discs has a truncated conical surface with its smallest diameter being larger than said given diameter and facing said second-type discs.

3. The tube defined in claim 2, further including a third-type disc situated intermediate each of said first-type discs and said second-type discs, each of said third-type discs being supported by said dielectric rod in spaced relationship with respect to said envelope, and each of said third-type discs having a truncated conical surface bore therethrough aligned with the respective bores of said first- and second-type discs, the smaller diameter of the bore of said third-type disc facing said second-type discs and being at least equal to said given diameter, and the larger diameter of the bore of each of said third-type discs facing said first-type disc and being no greater than the smaller diameter of said first-type disc it is facing.

4. The tube defined in claim 1, wherein said discs are composed of a carbon material.

5. The tube defined in claim 4, wherein said carbon material is polycrystalline graphite.

References Cited

"Continuous-Duty Argon Ion Lasers," E. F. Labuda et al., Journal of Quantum Electronics, vol. QE–1, No. 6; September 1965.

RONALD L. WIBERT, Primary Examiner

C. CLARK, Assistant Examiner